United States Patent Office 3,403,167
Patented Sept. 24, 1968

3,403,167
3,17-DISUBSTITUTED D-HOMOANDROSTANE
Wataru Nagata, Hyogo Prefecture, Japan, assignor to Shionogi & Co., Ltd., Osaka, Japan
No Drawing. Application May 12, 1965, Ser. No. 464,264, now Patent No. 3,345,385, dated Oct. 3, 1967, which is a division of application Ser. No. 127,097, July 27, 1961, now Patent No. 3,206,472. Divided and this application Oct. 19, 1965, Ser. No. 516,807
Claims priority, application Japan, Mar. 12, 1960, 35/8,208; Mar. 19, 1960, 35/9,421; Apr. 4, 1960, 35/20,124, 35/20,125; Apr. 6, 1960, 35/20,723; Apr. 21, 1960, 35/22,417; Apr. 25, 1960, 35/22,611
4 Claims. (Cl. 260—340.9)

ABSTRACT OF THE DISCLOSURE 3,17-disubstituted D-homoandrostanes are useful as intermediates in the total synthesis of steroids.

The present application is a division of copending patent application Ser. No. 464,264, filed May 12, 1965, now U.S. Patent No. 3,345,385 which is a division of copending patent application Ser. No. 127,097, filed July 27, 1961 (now U.S. Patent No. 3,206,472). Said application Ser. No. 127,097 is a continuation-in-part of co-pending applications Ser. No. 93,869, Ser. No. 94,988, Ser. No. 98,334 and Ser. No. 103,741, filed, respectively, on Mar. 7, 1961, Mar. 13, 1961, Mar. 27, 1961, and Apr. 14, 1961 (all now abandoned).

This invention relates to novel intermediates useful in the total synthesis of steroids. More particularly, said intermediates are of the formula:

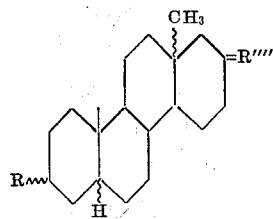
(I)

wherein:

R when divalent, is either oxo or ethylene-dioxy and, when monovalent, is either hydroxy or acetoxy;
R'''' is either oxo or ethylenedioxy; and ripple ($\xi$) is a generic indication of the α- and β-configurations;

and the steroids prepared therefrom are of the formula:

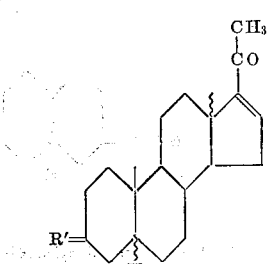
(II()

wherein R' is either

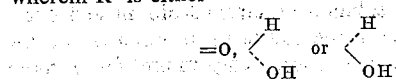

and ripple ($\xi$) is as previously defined.

The starting compounds for the preparation of compounds (I) are 18-formyl-3,17-disubstituted D-homoandrostanes (III)

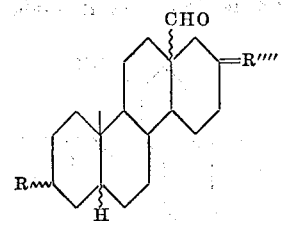
(III)

where R and the ripple mark have their above-ascribed meanings; which are prepared according to the procedure of parent application Ser. No. 127,097 (U.S.P. 3,206,472).

The preparation of compounds (I) from compounds (III) and the use of compounds (I) to prepare compounds (II) are exemplified in the following reaction scheme:

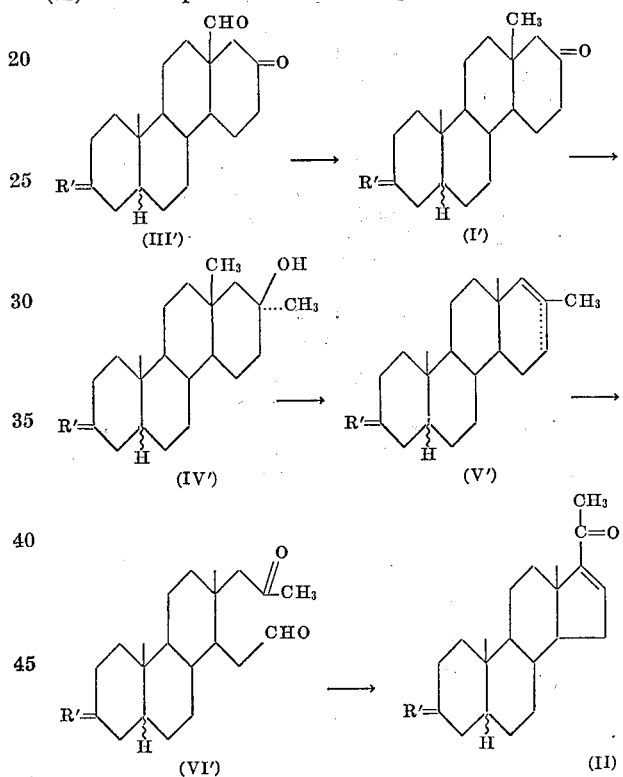

Compound (I') is prepared from compound (III') by reductive methylation. Compound (IV') is prepared from compound (I') by the step of 17-methylation.

In the noted preparation of compound (I') the reaction may be carried out by changing compound (III') to the semicarbazone, hydrazone or azine thereof and decomposing the latter with heating in the presence of an alkaline catalyst, such as sodium methoxide, sodium ethoxide, sodium hydroxide and potassium hydroxide, in the presence or absence of an inert organic solvent, such as methanol, ethanol, diethyleneglycol and triethyleneglycol.

Compound (V') is prepared by dehydrating compound (IV') to the Δ¹⁷-methyl compound. The reaction may be carried out by treating compound (IV') with dehydrating agents, such as pyridine and phosphorus chloride. As the result of the reaction, there is obtained compound (V)' as a tautomeric mixture.

The oxidative fission of the 6-membered ring D of compound (V') to form the keto aldehyde (VI') and the dehydrative ring closure of compound (VI') to the final product (II') completes the synthesis.

The oxidative fission may be carried out by treating compound (V') with oxygen-ozone in an inert organic solvent, such as chloroform, methanol and ethanol, and then treating the resulting ozonide with zinc and acetic acid. As the result of the reaction, there is obtained a mixture of compound (VI') and its isomer

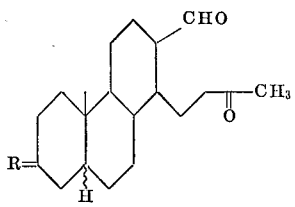

(VII)

Although the mixture may be treated in the following step without separation, it can be separated by chromatography at the present stage.

Compound (VI') is treated with triethylamine and acetic acid in an inert solvent, such as benzene, toluene and xylene, in a sealed tube to obtain therefrom the corresponding compound (II').

Final products (II) are 3-substituted pregn-16-en-20-ones exemplified by:

3α-hydroxy-5β,13β-pregn-16-en-20-one and its 3-acylate,
3β-hydroxy-15α,13β-pregn-16-en-20-one and its 3-acylate,
5β,13β-pregn-16-en-3,20-dione and its 3-ketal,
5α-,13β-pregn-16-en-3,20-dione and its 3-ketal,
3β-hydroxy-5β,13α-pregn-16-en-20-one and its 3-acylate,
3β-hydroxy-5α,13-pregn-16-en-20-one and its 3-acylate,
5β,13α-pregn-16-en-3,20-dione and its 3-ketal, and
5α,13α-pregn-16-en-3,20-dione and its 3-ketal.

Among these products, 13β-methyl compounds have been isolated from human urine and can be converted into other steroids having medicinal effect per se according to the methods per se known to those skilled in the art. An illustrative example is shown as follows:

Namely, 3β-acetoxy-5α-pregn-16-en-20-one may be changed into 3β,21-diacetoxy - 17α-hydroxy-5α-pregn-16-en-20-one by the application of the methods described in Djerassi et al.; J.A.C.S. 76, 1722 (1954); Moffett et al.: J.A.C.S. 74, 2183 (1954); and Julian et al.: J.A.C.S. 72, 362 (1950), and the latter converted into cortexolone according to the methods described by Evans et al.: J.C.S. 4356 (1956); J. Pataki et al.: J.A.C.S. 74, 5615 (1952); and J. M. Chemerda et al: J.A.C.S. 73, 4052 (1951).

The following examples illustrate methods of carrying out the present invention, but it is to be understood that these examples are given for purposes of illustration and not of limitation.

In the examples which follow, the abbreviations and symbols have the following significances:

"g." means gram(s);
"ml." means milliliter(s);
"mg." means milligram(s);
"hr.(s)" means hour(s);
"min.(s)" means minute(s);
"Anal. Calcd." means analysis calculated, and
"MP." means melting point.

Other abbreviations and symbols have conventional significances.

EXAMPLE I

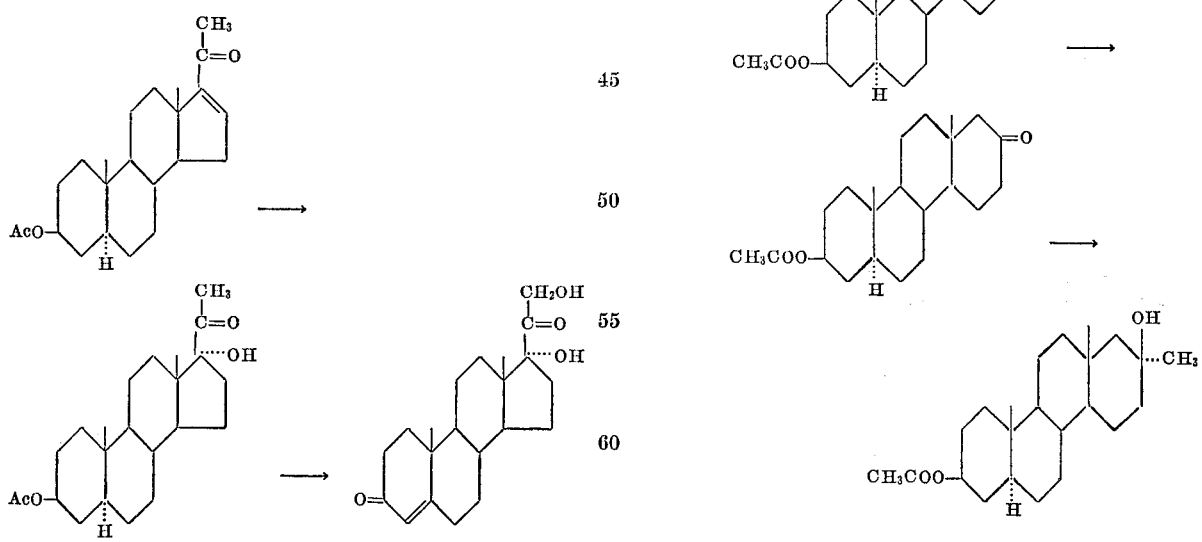

A solution of 138.5 mg. of dl-3β-acetoxy-13β-cyano-D-homo-5α-androstan-17-one ethylene ketal in 10 ml. of tetrahydrofuran is added to 20 ml. of 0.172 M-lithium aluminum hydride solution in tetrahydrofuran under ice-cooling and stirring in the course of 30 minutes and the stirring is continued at room temperature for 3 more hours. The reaction mixture is cooled, 10 ml. of water added, and then refluxed for 8 minutes to hydrolyze the imino compound. After concentration to a half volume under reduced pressure, the reaction mixture is neutralized by acetic acid and extracted 3 times with chloroform. The chloroform solution is washed with water, dried and distilled to remove the solvent. To the residue (142.4 mg.) is added 1.5 ml. of acetic anhydride and 2.5 ml. of pyridine and the whole allowed to stand overnight at room temperature. The crude acetylated product obtained in conventional manner from the above reaction mixture, 160 mg., is chromatographed on 8 g. of alumina (Welm III, neutral). From the fraction of petroleum ether-benzene (9:1–2:1), 50.3 mg. of dl-3β-acetoxy-17-oxo-D-homo-5α-androstan-18-al 17-ethylene ketal are obtained as crystals, M.P. 170–179° C., after recrystallization with acetone-ether. By further recrystallization, the mother liquor gives 20.4 mg. more of the crystals.

Thus obtained dl-3β-acetoxy-17-oxo-D-homo-5α-androstan-18-aldehyde 17-ethylene ketal (60 mg.) is admixed with potassium hydroxide (106 mg.), 80% hydrazine hydrate (0.3 ml.) and triethyleneglycol (2 ml.) and heated at 130–135° C. for 1 hr. The reaction temperature is gradually elevated. During the elevation, excess of hydrazine hydrate and water are distilled off. Then, the mixture is heated at 210–220° C. for 3 hrs. After cooling, the mixture is poured into ice-water and extracted with chloroform. The extract is washed with water, dried and evaporated to dryness. The residue (65.9 mg.) is recrystallized from ethanol to give dl-3β-hydroxy-D-homo-5α-androstan-17-one ethylene ketal (34.8 mg.), as plates, M.P. 221–223° C.

IR (Nujol): 3602, 3551, 1102, 1075 cm.$^{-1}$.

Anal. Calcd. for $C_{22}H_{36}O_3$ (348.51): C, 75.81; H, 10.41. Found: C, 75.71; H, 10.38.

Acetylation of dl-3β-hydroxy-D-homo-5α-androstan-17-one ethyleneketal gives dl-3β-acetoxy-D-homo-5α-androstan-17-one ethyleneketal, M.P. 164–166/173–174° C.

Ir (Nujol): 1731, 1241, 1028, 1020, 1102, 1078 cm.$^{-1}$.

Anal. Calcd. for $C_{24}H_{38}O_4$ (390.54): C, 73.80; H, 9.81. Found: C, 73.76; H, 9.80.

Deketalization of dl-3β-acetoxy-D-homo-5α-androstan-17-one ethyleneketal gives dl-3β-acetoxy-D-homo-5α-androstan-17-one, M.P. 160–163° C.

IR (Nujol): 1739, 1711, 1248, 1239, 1028 cm.$^{-1}$.

Anal. Calcd. for $C_{22}H_{34}O_3$ (346.49): C, 76.26; H, 9.89. Found: C, 76.30; H, 9.77.

To an ether solution of Grignard reagent which is prepared from methyl iodide (2.07 g.) and magnesium (356 mg.) in anhydrous ether (14 ml.) is added dropwise another solution of dl-3β-acetoxy-D-homo-5α-androstan-17-one (513.7 mg.) in anhydrous benzene (15 ml.) with stirring under ice-cooling. The dropwise addition takes 20 mins. The mixture is stirred for 1 hr. at room temperature and ether is distilled off. After adidtion of anhydrous benzene (30 ml.), the mixture is refluxed for 2.5 hrs. Then the mixture is ice-cooled, N-hydrochloric acid (20 ml.) is added and the mixture is extracted 5 times with chloroform-methanol (3:1). The extract is washed twice with a half-saturated aqueous solution of sodium sulfate, dried over anhydrous sodium sulfate, and evaporated. To the residue (623.9 mg.) are added acetic anhydride (4 ml.) and dry pyridine (5 ml.) and the resultant is allowed to stand overnight at room temperature. Thus obtained crude acetate (671.6 mg.) is recrystallized from acetone-ether to give 17α-methyl-D-homo-androstan-3β,17β-diol-3β-acetate (2.91.1 mg.) as prisms, M.P. 142–144/162–163° C. (it melts once at 142–144° C., then solidifies and melts again at 162–163° C.). Then, 151.2 mg. more of the product are obtained from the mother liquor. Totally, 442.3 mg. of 17α-methyl-D-homo-5α-androstan-3β,17β-diol 3-acetate are obtained.

IR: $\nu_{max.}^{CHCl_3}$ 3625, 3505 (OH), 1726, 1249, 1025 ($CH_3COO$) cm.$^{-1}$.

Anal. Calcd. for $C_{23}H_{38}O_3$ (362.53): C, 76.19; H, 10.57. Found: C, 76.22; H, 10.60.

The configuration of the methyl radical in the 17-position is confirmed synthetically.

EXAMPLE II

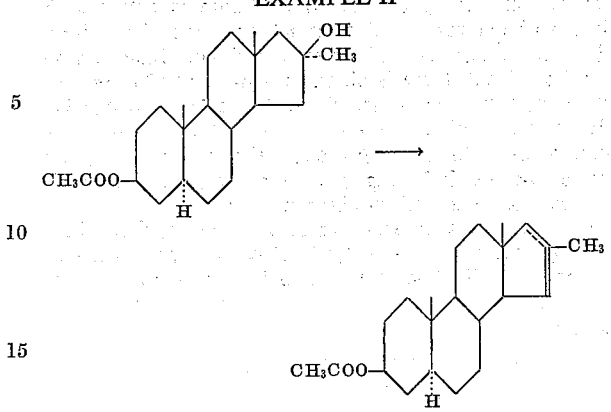

dl-17α-methyl-D-homo-5α-androstan-3β,17β-diol 3-acetate (540 mg.) is dissolved in dry pyridine (4 ml.). To the solution is added dropwise phosphorus chloride (0.5 ml.) with agitation under cooling. Then, the mixture is heated at 60–65° C. for 40 mins. Working up as usual, the crude crystals obtained are recrystallized from ethanol to give 437.6 mg. of crystals melting at 119–120° C. From the mother liquor there are obtained 13.2 mg. more of the product. Totally, 450.8 mg. of the product are yielded. This product is a tautomeric mixture of dl-17-methyl-D-homo-5α-androst-16-en-3β-ol acetate and dl-17-methyl-D-homo-5α-androst-17-en-3β-ol acetate.

IR: $\nu_{max.}^{Nujol}$ 1729, 1260, 1238, 1043, 1038 ($CH_3COO$), 831 (double bond) cm.$^{-1}$ Anal. Calcd. for $C_{23}H_{36}O_2$: C, 80.18; H, 10.55. Found: C, 80.42; H, 10.44.

EXAMPLE III

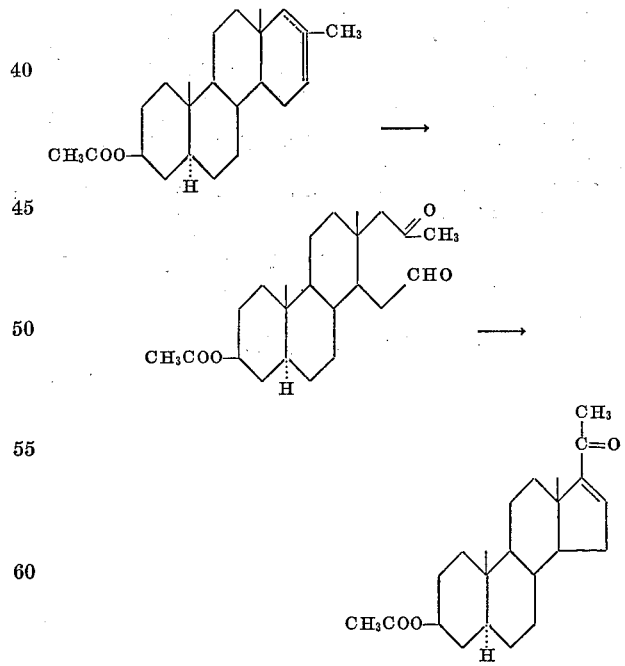

A tautomeric mixture (50 mg.) of dl-17-methyl-D-homo-5α-androst-16-en-3β-ol acetate and dl-17-methyl-D-homo-5α-antrost-17-en-3β-ol acetate is dissolved in chloroform (7 ml.) and anhydrous methanol (3 ml.) and the solution is cooled to −80° C. with acetone-Dry Ice. Then 150 ml. of oxygen-ozone (ozone is contained at a ratio of 3.18% (v./v.) are introduced at the velocity of 50–60 ml./min. and the whole allowed to stand for 20 mins. Then glacial acetic acid (0.1 ml.) and zinc dust (100 mg.) are added to decompose the ozonide, and the zinc dust is filtered off. The filtrate is concentrated in vacuo, water is added, and the mixture is extracted 3 times with chloroform. The extract is washed with sodium bicarbonate solution and water, and dried. Upon removing the solvent, there is obtained a mixture (70 mg.) of dl-3β-acetoxy - 16 - acetyl-16,17-seco-5α-androstan-17-aldehyde and dl-3β-acetoxy - 17 - acetyl-16,17-seco-5α-androstan-16-aldehyde. Although the mixture may be treated in the following process without separation, it can be also separated by chromatography.

Characteristics of each component are the following:

dl-3β-acetoxy - 17 - acetyl-16,17-seco-5α-androstan-16-aldehyde (dl-3β-acetoxy-20-oxo-16,17-seco-5α-pregnan-16-aldehyde): Needles, M.P. 112–115° C. (from ether-pentane).

IR: $\nu_{max.}^{CHCl_3}$ 2711 (CHO), 1725 (CH$_3$COO, CHO), 1714 (CO), 1245, 1029 (CH$_3$COO) cm.$^{-1}$ Anal. Calcd. for $C_{23}H_{36}O_4$(379.52): C, 73.36; H, 9.64. Found: C, 73.42; H, 9.62.

dl-3β-acetoxy - 16 - acetyl-16,17-seco-5α-androstan-17-aldehyde: Prisms, M.P. 118.5–120° C. (from ether-pentane).

IR: $\nu_{max.}^{CHCl_3}$ 2697 (CHO), 1722 (CH$_3$COO, CHO, CO), 1248, 1028 (CH$_3$COO) cm.$^{-1}$ Anal. Calcd. for $C_{23}H_{36}O_4$(376.52): C, 73.36; H, 9.64. Found: C, 73.27; H, 9.55.

A mixture (70 mg.) of dl-3β-acetoxy-16-acetyl-16,17-seco-5α-androstan - 17 - aldehyde and dl-3β-acetoxy-17-acetyl-16,17-seco-5α-androstan-16-aldehyde is dissolved in dry xylene (1 ml.) and a solution of triethylamine (0.6 ml.) and glacial acetic acid (0.36 ml.) in dry xylene (10 ml.) is added. The mixture is placed in a glass-tube, cooled to —85° C., and sealed under reduced pressure (1 torr). The tube is heated for 10 hrs. in a xylene bath. After chilling, the reaction mixture is treated with 2 N-hydrochloric acid and water, and the aqueous layer is extracted with ether. The organic layers are combined, washed with water, dried, and evaporated. The oily residue (47.3 mg.) is chromatographed on alumina (Welm II) (2 g.). From the fraction of petroluem ether-benzene (9:1–8:2) is obtained dl-3β-acetoxy-5α-pregn-16-en-20-one as plates, M.P. 158–164° C. (from methanol) (2.3 mg.), which is identified with the compound transformed from natural steroid.

IR: $\nu_{max.}^{CS_2}$ 3067 (double bond), 1735 (CH$_3$COO), 1670 (α, β-unsaturated ketone), 1238, 1026 (CH$_3$COO), 819 (double bond) cm.$^{-1}$ UV: $\lambda_{max.}^{EtOH}$ 240.5 mμ (ε:9110)

Anal. Calcd. for $C_{23}H_{34}O_3$(358.50): C, 77.05; H, 9.56. Found: C, 77.17; H, 9.50.

Then eluates with petroleum ether-benzene (7:3–3:7) are recrystallized from ether-pentane to give dl-3β-acetoxy-16-acetyl-5α-androst-16(17)-ene (10.3 mg.) as plates, M.P. 162–165° C.

IR: $\nu_{max.}^{CS_2}$ 3050 (double bond), 1735 (CH$_3$COO), 1670 (α, β-unsaturated ketone), 1238, 1025 (CH$_3$COO), 842 (double bond) cm.$^{-1}$ UV: $\lambda_{max.}^{EtOH}$ 241.5 mμ (ε:11500)

Anal. Calcd. for $C_{23}H_{34}O_3$(358.50): C, 77.05; H, 9.56. Found: C, 76.93; H, 9.53.

It is to be understood that the invention is not to be limited to the exact details of operation or exact compounds shown and described, it being intended to limit the invention only by the scope of th appended claims.

What is claimed is:

1. A compound of the formula:

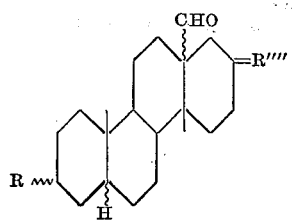

wherein:
R is a member selected from the group consisting of oxo and ethylenedioxy when divalent, and is a member selected from the group consisting of hydroxy and acetoxy when monovalent;
R'''' is a member selected from the group consisting of oxo and ethylenedioxy; and
ripple (⸛) is a generic indication of α- and β-configurations 2. 3β-hydroxy-D-homo - 5α - androstan-17-one 17-ethylene ketal.

3. 3β-acetoxy-D-homo - 5α - androstan - 17 - one 17-ethylene ketal.

4. 3β-acetoxy-D-homo-5α-androstan-17-one.

References Cited

UNITED STATES PATENTS 3,206,472  9/1965  Nagata _____ 260—340.9

NICHOLAS S. RIZZO, Primary Examiner.

J. H. TURNIPSEED, Assistant Examiner.